United States Patent
García Osma et al.

(10) Patent No.: US 10,715,891 B2
(45) Date of Patent: Jul. 14, 2020

(54) AUTO-PROVISION METHOD, A SYSTEM AND COMPUTER PROGRAM PRODUCTS FOR FTTH BACKHAUL, MIDHAUL OR FRONTHAUL FOR MOBILE BASE STATIONS BASED ON SDN

(71) Applicant: TELEFONICA DIGITAL ESPAÑA, S.L.U., Madrid (ES)

(72) Inventors: María Luisa García Osma, Madrid (ES); Alfonso Aurelio Carrillo Aspiazu, Madrid (ES); Daniel Velasco Benito, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 0 days.

(21) Appl. No.: 16/513,926

(22) Filed: Jul. 17, 2019

(65) Prior Publication Data
US 2020/0029139 A1    Jan. 23, 2020

(30) Foreign Application Priority Data
Jul. 18, 2018   (EP) .................................. 18382535

(51) Int. Cl.
H04Q 11/00   (2006.01)
G06F 16/182   (2019.01)
(Continued)

(52) U.S. Cl.
CPC ..... *H04Q 11/0067* (2013.01); *G06F 16/1824* (2019.01); *G06Q 20/382* (2013.01);
(Continued)

(58) Field of Classification Search
CPC combination set(s) only.
See application file for complete search history.

(56) References Cited

U.S. PATENT DOCUMENTS

| 8,774,629 B2 | 7/2014 | Wu et al. |
| 9,287,982 B2 | 3/2016 | Zang et al. |

(Continued)

FOREIGN PATENT DOCUMENTS

| EP | 2 887 566 A1 | 6/2015 |
| EP | 3 157 223 A1 | 4/2017 |

OTHER PUBLICATIONS

European Search Report for EP 18 38 2535 dated Oct. 17, 2018.
Written Opinion for EP 18 38 2535 dated Oct. 17, 2018.

*Primary Examiner* — Omar S Ismail
(74) *Attorney, Agent, or Firm* — Sughrue Mion, PLLC

(57) ABSTRACT

An auto-provision method, system and computer programs for FTTH backhaul, midhaul or fronthaul for mobile base stations based on SDN. The method comprises detecting, by OLT when an ONU is connected to an optical termination point and responsive to said detection said OLT notifying a SDN controller. The SDN controller then provides connectivity to a base station connected to the ONU to a first restricted network providing access to a web site with limited connectivity. Then, said web site receives credential information identifying a technician of the base station and, once the technician is connected therein, further receives configuration information specifying which FTTH services the base station requires subscription. The SDN controller then disconnects the base station from the web site and reconnects it to a second network configured to provide access to a core network and to the subscribed FTTH services to the base station.

15 Claims, 4 Drawing Sheets

(51) Int. Cl.
*G06Q 20/38* (2012.01)
*H04L 12/46* (2006.01)
*H04L 12/24* (2006.01)

(52) U.S. Cl.
CPC ...... *H04L 12/4641* (2013.01); *H04L 41/0886* (2013.01); *H04L 41/5054* (2013.01); *H04Q 2213/05* (2013.01)

(56) References Cited

U.S. PATENT DOCUMENTS

| | | | |
|---|---|---|---|
| 2007/0127554 A1* | 6/2007 | Tamai | H04J 14/025 375/141 |
| 2007/0274720 A1 | 11/2007 | Menasco, Jr. et al. | |
| 2012/0294613 A1 | 11/2012 | Hood et al. | |
| 2014/0363163 A1* | 12/2014 | Morper | H04L 45/38 398/58 |
| 2014/0371941 A1* | 12/2014 | Keller | H02J 13/0006 700/297 |
| 2015/0207677 A1* | 7/2015 | Choudhury | H04L 41/0806 370/254 |
| 2015/0215914 A1* | 7/2015 | Cho | H04W 28/10 370/235 |
| 2015/0270988 A1* | 9/2015 | Finkelstein | H04L 12/66 370/401 |
| 2015/0304209 A1* | 10/2015 | Choudhury | H04L 41/12 370/255 |
| 2015/0333834 A1* | 11/2015 | Liu | H04B 10/27 398/66 |
| 2015/0365288 A1* | 12/2015 | Van Der Merwe | H04L 41/5051 370/254 |
| 2016/0099775 A1* | 4/2016 | Liu | H04B 10/25752 398/115 |
| 2016/0105236 A1* | 4/2016 | Zhang | H04B 10/25 398/152 |
| 2016/0337248 A1* | 11/2016 | McCann | H04W 28/02 |
| 2016/0337937 A1* | 11/2016 | McCann | H04L 45/64 |
| 2016/0359888 A1* | 12/2016 | Gupta | G06F 16/235 |
| 2016/0381146 A1* | 12/2016 | Zhang | H04W 4/025 709/228 |
| 2017/0181021 A1* | 6/2017 | Yoon | H04W 24/08 |
| 2017/0238362 A1* | 8/2017 | Karandikar | H04W 88/16 370/328 |

\* cited by examiner

AUTO-PROVISION METHOD, A SYSTEM AND COMPUTER PROGRAM PRODUCTS FOR FTTH BACKHAUL, MIDHAUL OR FRONTHAUL FOR MOBILE BASE STATIONS BASED ON SDN

FIELD OF THE ART

The present invention relates to an auto-provision method, and corresponding system, for Fiber to Home (FTTH) backhaul, midhaul or fronthaul for mobile base stations based on Software Defined Networking (SDN). The invention provides auto-provision capacities to connect mobile base stations using FTTH backhaul, midhaul or fronthaul, offering the means to connect and disconnect base stations to the network in real time using SDN capabilities and the same infrastructure and provision capacities deployed for residential customers/users.

BACKGROUND OF THE INVENTION

US-B2-9287982 introduces provision automatization by storing in the optical network unit (ONU) subscriber recognition information. This data has been previously provided by the network operator and it is introduced in the ONU by the subscriber. The ONU uses this information to connect to the network.

U.S. Pat. No. 8,774,629 is similar to the previous patent as it is based on the ONU capability to authenticate itself to the network. It is also quite similar to the mechanism currently implemented to connect FTTH customers, as ONU and optical liner terminal (OLT) ports are "paired".

US20070274720 proposes a mechanism to "lock" an ONU to an OLT port by using an identification mechanism based on a code that it is provided by the fiber technician.

US20120294613 introduces a mobile device that can register the information of the ONU (e.g. using RFID) and upload it to the provision system, which will register the ONU with the corresponding OLT port.

EP2887566A1 uses RFID tags to acquire the information required to connect the ONU to the network, streamlining the provision process.

Previously described references provide means to streamline the registration of the ONU with a given OLT port. However, they do not authenticate the user, but the ONU device itself. Additionally, existing registration procedures are limited and do not provide enhanced interactions with the user, such as enabling the customer/users to activate and deactivate FTTH service on-line or the modification of the service in real time.

All previous references authenticate the ONU in the network, but none of them authenticate the customer/user, thus requiring a registration of the equipment both the first time the service is activated and whenever the ONU is changed. On the contrary, present invention authenticates the user, so (s)he can activate the service and change or replace the ONU which was originally used to provision the service just by authenticating herself/himself in the subscriber portal, as the proposed method will automatically register the ONU used by the user when he connected to the subscriber portal (this way, the ONU can be discovered during the process and included in the inventory systems once provisioning is successfully completed).

None of the prior art solutions provides connectivity until the FTTH service is fully provisioned and active. Therefore, the user requires an alternative connection (e.g. mobile) or visiting a store to subscribe to the services. Instead, the proposed solution uses the already available FTTH network terminal connection to enable access to a walled garden where customers or non-customers can subscribe or activate services.

Furthermore, the user would be able to take its ONU to a different location with FTTH services and be recognized by the BSS/OSS and their configuration be recovered and instantiated at the new location.

SUMMARY OF THE INVENTION

Present invention provides an auto-provision method for FTTH backhaul, midhaul or fronthaul for mobile stations based on SDN. According to the proposed method a base station, either macro or microcell, is connected to an ONU. The ONU can be integrated in the base station or can be external to the latter.

In an embodiment, the proposed method comprises detecting, by an OLT installed within an Internet service provider infrastructure, when the ONU is connected to an optical termination point, and responsive to said detection, the OLT notifying a SDN controller installed at said Internet service provider infrastructure about the ONU-OLT connection. The method also comprises providing, by the SDN controller, connectivity to said base station to a first restricted network providing access to a web site with limited connectivity (e.g. a walled garden), and receiving, by the web site with limited connectivity, credential information (e.g. a username and password) identifying a technician of the base station on the web site with limited connectivity. The web site with limited connectivity, once the technician is connected therein, further receives configuration information specifying which FTTH backhaul, midhaul or fronthaul services the base station requires subscription. Finally, the method comprises disconnecting, by the SDN controller, the base station from the web site with limited connectivity and reconnecting the base station to a second network configured to provide access to a core network and to the subscribed FTTH backhaul, midhaul or fronthaul services to the base station.

In another embodiment, the proposed method comprises detecting, by an OLT installed within an Internet service provider infrastructure, when the ONU is connected to an optical termination point, and responsive to said detection, the OLT notifying a SDN controller installed at said Internet service provider infrastructure about the ONU-OLT connection and sending an event activating a temporary vCPE installed within the Internet service provider infrastructure. The method also comprises providing, by the SDN controller, connectivity to the base station to a first restricted network providing access to a web site with limited connectivity by means of connecting the base station to the temporary vCPE via a first virtual network and by connecting the temporary vCPE to the web site with limited connectivity via a second virtual local area network. Then, the web site with limited connectivity receives credential information (e.g. a username and password) identifying a technician of the base station on the web site with limited connectivity, and once the technician is connected to the web site with limited connectivity, the latter further receives configuration information specifying which FTTH backhaul, midhaul or fronthaul services the base station requires subscription. Finally, the method comprises disconnecting, by the SDN controller, the base station from the web site with limited connectivity and from the temporary vCPE and reconnecting the base station to a second network configured to provide access to a core network and to the subscribed FTTH backhaul, midhaul or fronthaul services to the base station.

According to the proposed invention, the FTTH backhaul, midhaul or fronthaul services not only include connectivity services (e.g. 1 Gbps symmetrical connection, GPON, XGS-PON, etc.) but also may include connectivity services and virtual network functions (VNFs) and multi-access Edge computing (MEC) services The credential information can be received, according to an embodiment, via an online registration of the technician in the web site with limited connectivity. Alternatively, the credential information can be received via an online or offline means provided by an operator of the first restricted network.

According to the proposed method, the temporary vCPE can be exclusive for the base station or alternatively be shared among other base stations.

In an embodiment, upon the base station has accessed to the subscribed FTTH backhaul, midhaul or fronthaul services an identification number of the ONU is stored in a memory or database.

In an embodiment, the subscribed FTTH backhaul, midhaul or fronthaul services are further stored in a smart contract of a Blockchain or Distributed Ledger to increase flexibility, security and accountability.

Other embodiments of the invention provide a system for auto-provision FTTH backhaul, midhaul or fronthaul for base stations based on SDN, comprising:

an Internet service provider infrastructure comprising an OLT and a SDN controller;
an optical termination point;
an ONU; and
at least one base station.

According to the proposed system the base station, either macro or microcell, is connected to the ONU. Besides, the ONU can be integrated in the base station or can be external to the latter.

According to an embodiment, the OLT is adapted and configured to detect when the ONU is connected to the optical termination point and to notify the SDN controller upon said detection, the SDN controller being adapted and configured to provide connectivity to said base station to a first restricted network providing access to a web site with limited connectivity.

Moreover, the web site with limited connectivity is adapted and configured to receive credential information identifying a technician of the base station on the web site with limited connectivity and to, once the technician is connected therein, further receive configuration information specifying which FTTH backhaul, midhaul or fronthaul services the base station requires subscription. Furthermore, the SDN controller is adapted and configured to disconnect the base station from the web site with limited connectivity and to reconnect the base station to a second network via the vCPE to provide access to a core network and to the subscribed FTTH backhaul, midhaul or fronthaul services to the base station.

In another embodiment, the Internet service provider infrastructure further comprises a temporary vCPE adapted and configured to be connected to the OLT. The temporary vCPE is connected to the base station via a first virtual local area network and is connected to the web site with limited connectivity via a second virtual local area network to allow the connectivity between the base station and the first restricted network The proposed system may also comprise a smart contract in a Blockchain to store the subscribed TFFH backhaul, midhaul or fronthaul services.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Therefore, present invention allows connecting mobile base stations using the infrastructure and methods deployed to provide fiber access and auto-provision capabilities for residential customers/users in real time. Connecting a base station will only require a fiber termination point (it could be either available, e.g. if a small cell is to be deployed inside a building or installed ahead of/during the base station deployment) and a base station that either has a ONU device integrated or the means to connect it to an external ONU device. Initially, the base station will have a limited connectivity, only enabling access to a dedicated provision network (the same one used for residential customers/users). This network will only provide access to a single web site (walled garden), where the technician in charge of the base station installation will be able to activate the FTTH connection required as backhaul, midhaul or fronthaul. Credentials will be provided to the field engineers by the Telco operator who owns the infrastructure and will be configured so a given technician will only be able to access to those backhaul, midhaul or fronthaul related connection services to which he is authorized to use, so these services will be not available for residential customers/users nor for all technicians. This way, some technicians will be able to provision and configure all kind of connectivity services, while others, such as the employees of third parties, such as other Telco operators, will only be able to configure a limited set of connectivity functions on given central offices.

This way, a fiber backhaul, midhaul or fronthaul connection could be provisioned, in a matter of minutes without requiring a pre-activation of the service. Once the technician has installed the base station hardware and assuming that a fiber drop is available, the process to connect the base station to the network will be fast and straightforward, as the service activation will not require any pre-provision tasks nor pre-configuration in the OSS systems. Moreover, the network inventory will be automatically updated with the information of the new base station and any additional VNFs deployed and configured.

BRIEF DESCRIPTION OF THE DRAWINGS

The previous and other advantages and features will be more deeply understood from the following detailed description of embodiments, with reference to the attached figures, which must be considered in an illustrative and non-limiting manner, in which.

DETAILED DESCRIPTION OF THE INVENTION AND OF SEVERAL EMBODIMENTS

Figure 1:
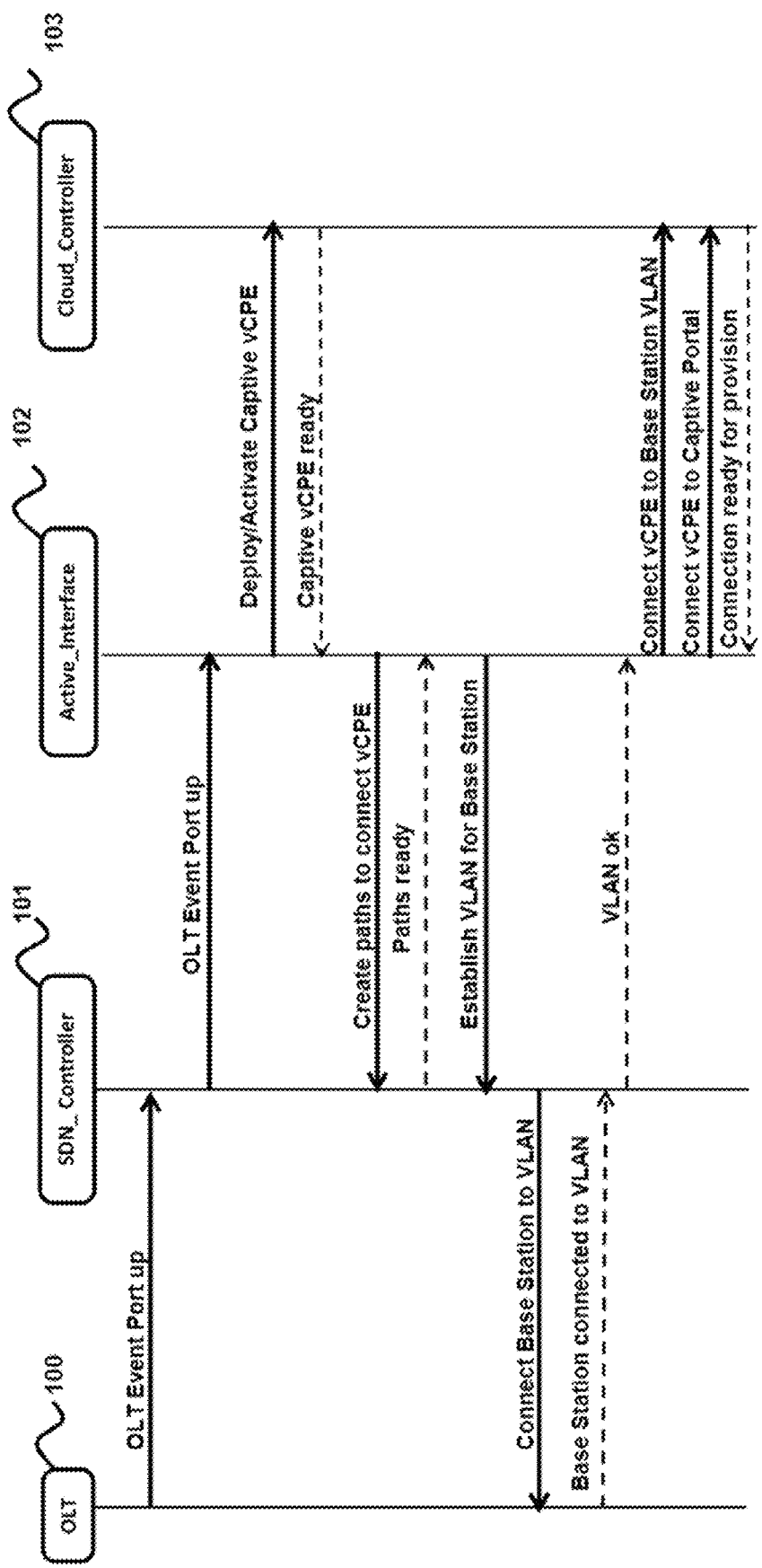
FIG. 1 is a flow chart illustrating the initial connection flow with the temporary vCPE, according to an embodiment.

Present invention provides an auto-provision method for Fiber-To-The-Home (FTTH) backhaul, midhaul or fronthaul for base stations based on SDN.

Given that there is already an optical termination point in the place chosen to deploy the base station 40, the technician will only need to connect the base station 40 to an ONU 41, preferably homologated by a service provider, if both are not integrated in the same device. The ONU 41 will then be connected to the optical termination point. It is important to notice that current provision methods require the ONU 41 to be registered with the OLT 100, where it is going to be connected before the connection can be used. This way, current methods use the ONU 41 as the only means to activate the service, whereas the proposed method uses the technician credentials to enable the access to the network. Therefore, a pre-registration of the ONU/base station 41/40 is no longer required, as any ONU 41 could be used to enable access to the service, given that it is either provided by the service provider or homologated as suitable equipment to be connected to the service provider FTTH network.

Once the technician has connected the ONU 41 to the optical termination point and the base station 40 to the ONU 41 (if both are not integrated), the technician can use it to access to a service provider on-line customer/user portal to activate or subscribe to the FTTH backhaul, midhaul or fronthaul service. Whenever a new network element (e.g. a small cell, a base station or a residential ONU/CPE, etc.) is connected to the network, an active interface 102 will detect it and will use SDN capabilities (managed by a SDN controller 101) to build the paths between the OLT 100 and a provision portal 121 to provide the device a limited connectivity. Even if the technician does not know the address of the on-line portal, it would not be an issue as the network will use DNS address resolution to redirect all the web traffic to the customer/user portal, no matter which web page the user tries to access.

The proposed method uses a combination of SDN and virtualization to achieve the previously described functionality: The OLT(s) 100 installed in the service provider infrastructure (e.g. the central office) 120 is/are configured to notify the SDN controller 101 whenever an ONU 41 is connected to an optical termination point, if the service has not been previous activated. Once an OLT 100 detects a new connection in a previously unused port, by means of OMCI notifications, it begins the process to activate the service.

Figure 2:
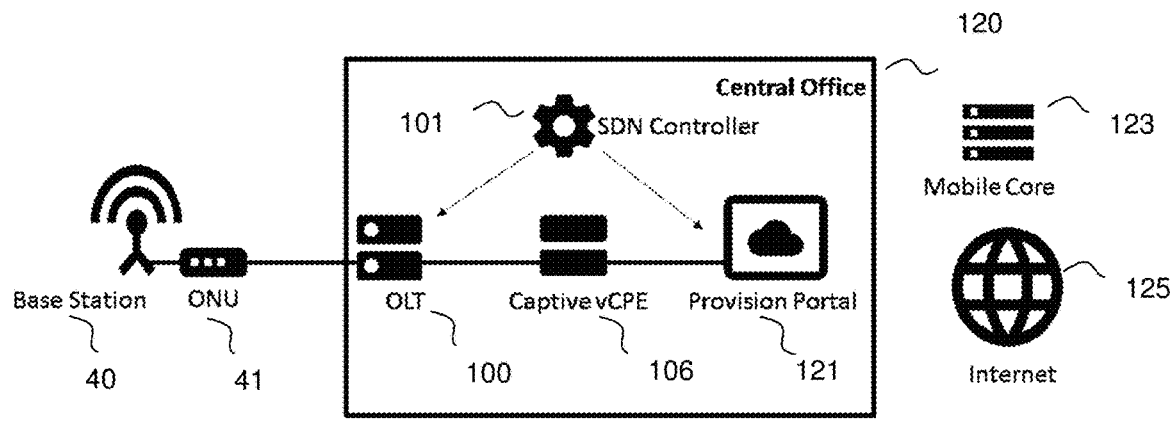
FIG. 2 schematically illustrates the temporary vCPE connections of the embodiment of FIG. 1.

As shown in FIGS. 1 and 2, according to a first embodiment, once this new connection has been detected, the OLT 100 will send an event that will lead to the instantiation or activation of a temporary vCPE ("Captive vCPE") 106 within the operator virtualized infrastructure. Then, the SDN Controller 101 will build the paths required to connect this temporary vCPE 106 both to the ONU/base station 41/40 and to the provision portal 121, using a first VLAN to connect the ONU/base station 41/40 with the temporary vCPE 106 and a different VLAN to connect the temporary vCPE 106 with the provision portal 121, to completely isolate these non-verified connections for security reasons. This way, the technician will be connected to a temporary vCPE 106 that will only provide connectivity to a walled garden network with limited connectivity, where he will be only able to access the operator on-line portal to activate services.

This way, the technician will have immediate connection to the service provider fibre network, but only to access the provision portal 121, i.e. the web site with limited connectivity. At this point, the technician can identify himself as an authorized user to subscribe or activate the different available FTTH services. However, an unauthorized user will not be able to connect to Internet 125 nor to any service as the connection is established within a walled garden.

The provision portal for mobile base stations connections will be the same that it is used for residential customers/users to subscribe to the FTTH service(s), but the credentials used by the technicians will provide access to a completely different set of services.

Figure 3:
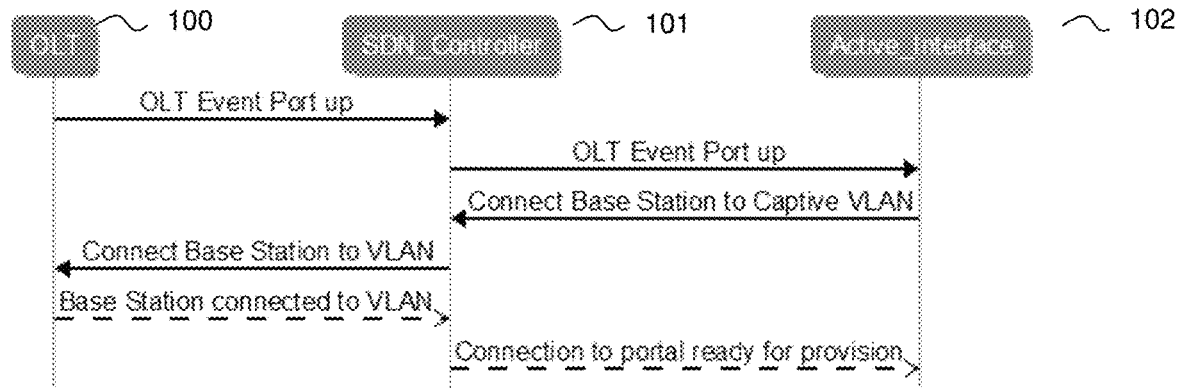
FIG. 3 is a flow chart illustrating the initial connection flow with direct connection to the web site/portal with limited connectivity, according to an embodiment.
Figure 4:
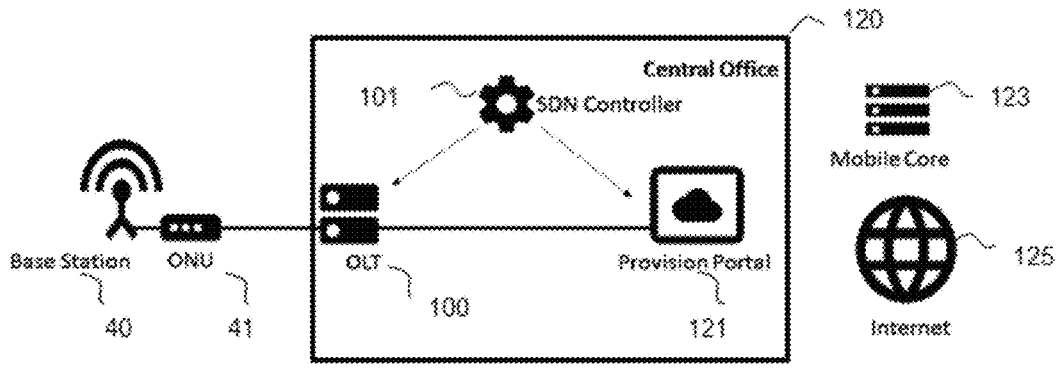
FIG. 4 schematically illustrates the connections of the embodiment of FIG. 3.

FIG. 3 shows an alternative, but analogous, implementation of the above first embodiment that consists on providing a direct connection to the web site with limited connectivity 121 without using a temporary vCPE 106. In this case, once the port up event has been detected, the SDN controller 101 would connect the base station 40 to the web site 121 directly and it would be the web/portal which will provide the required configuration in addition to the means to subscribe and activate services. In this case, the technician will also have connection to the service provider fibre network, but only to access the provision portal 121.

Figure 5:
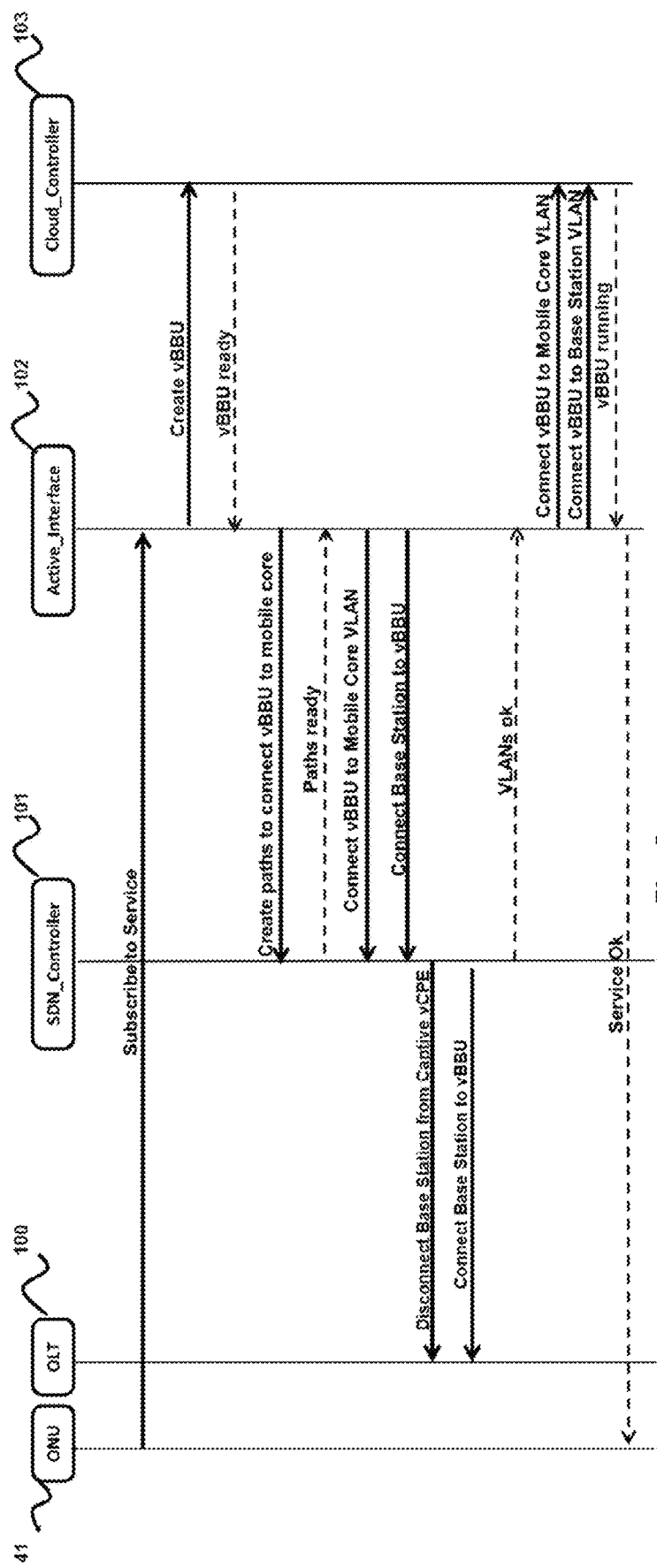
FIG. 5 is a flow chart illustrating the FTTH service activation flow (virtualized RAN case).

Referring now to FIG. 5, once the technician connects to the provision portal 121 and subscribes to the selected FTTH services, the activation flow will begin and the new connection will be available in a few minutes. The activation will require creating a new connection for the base station 40, configured with the subscribed FTTH services and customized with the chosen quality of service parameters. Once this new virtualized equipment is deployed, the SDN controller 101 will build the paths to access the network by providing connectivity to the required VNFs (e.g. Virtual Base Band Unit (vBBU) 116), MEC 118 infrastructure or to a centralized mobile core 123.

According to the first embodiment, the last step of the proposed method will consist on removing the base station 40 connection to the temporary vCPE 106 and connecting it to required networks, which will provide access to the production network. The base station 40 will be able to use different types of connectivity, which could range from a tunnel to the mobile core to L2 connection to a vBBU 116, to L3 connectivity to a vBBU 116, to an MPLS/VPLS connection to the mobile core network 123 or even CPRI over Ethernet for advanced radio splitting.

Although not show in the figures, the information regarding the connection provisioned (e.g. time and date, QoS characteristics, etc.) could be stored by means of smart contracts in a Blockchain or distributed ledger or using BSS functionalities.

Figure 6:
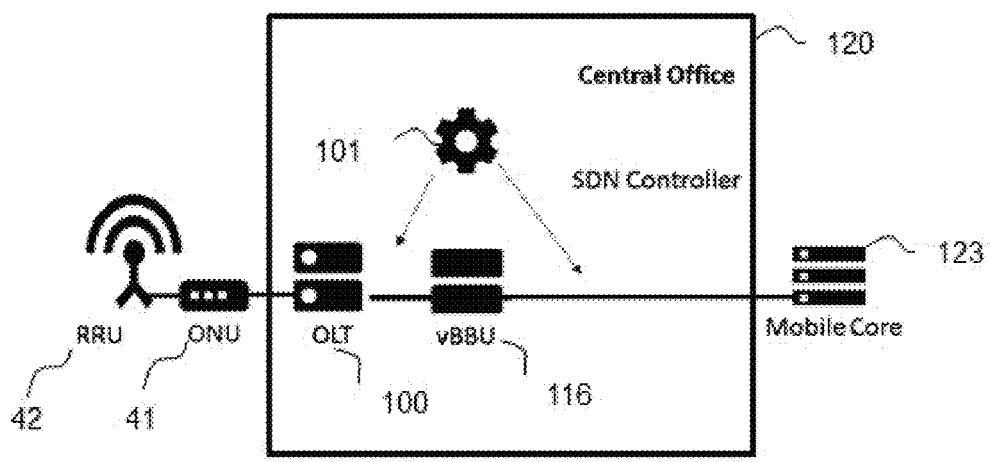
FIG. 6 schematically illustrates the base station connectivity once the base station has subscribed to the FTTH services, according to an embodiment (virtualized RAN case).

By using the network virtualization capabilities of the proposed solution, as shown in FIGS. 5 and 6, it will be also possible to deploy, in real time, the VNFs required to manage and provide the service to the base station 40. This figures depicts a use case where a vBBU 116 was required but not available in the corresponding central office 120 and the provision process would proceed to deploy the required VNF (i.e., vBBU 116) and then connect it to the mobile core 123 and the new base station. Other possible scenarios include the deployment of dedicated management tools or virtualized MEC elements 118.

During the service provision process, the serial number of the ONU 41 will preferably be stored in a memory or database (not shown), e.g. in the BSS of the service provider or the network inventory. This way, if a provisioned base station 40 disconnects from the network (e.g. power loss) without deactivating the service, it will not be required for a technician to authenticate to access the service again, as the network will recognize the ONU/Base Station 41/40 and provide access to the corresponding networks.

Although not shown in the FIGS. 5 and 6, once the service is active, the temporary vCPE 106 will be removed from the virtualized infrastructure and all the unused paths deleted to free up the resources.

Figure 7:
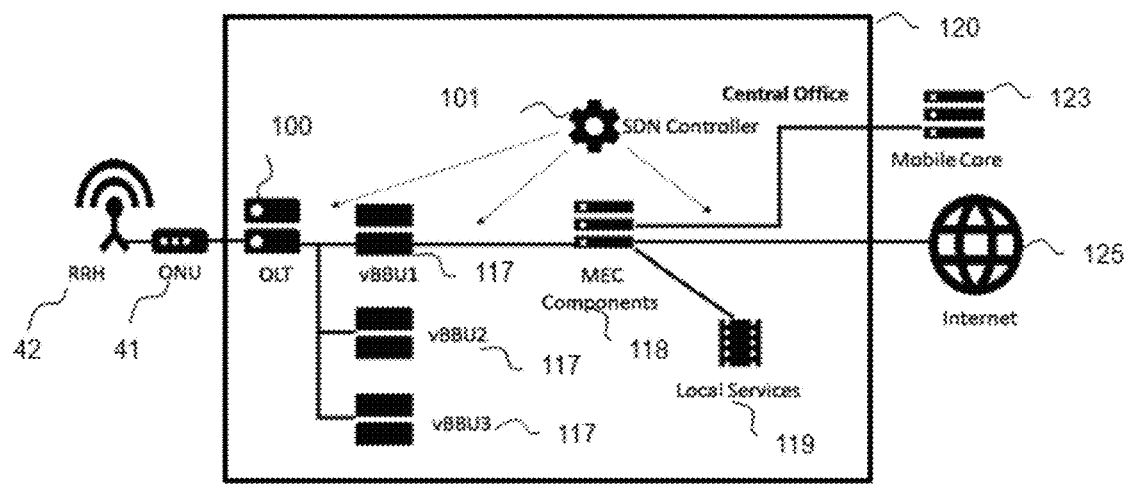
FIG. 7 schematically illustrates the base station connectivity once the base station has subscribed to the FTTH services, according to an embodiment (MEC functionality).
Figure 8:
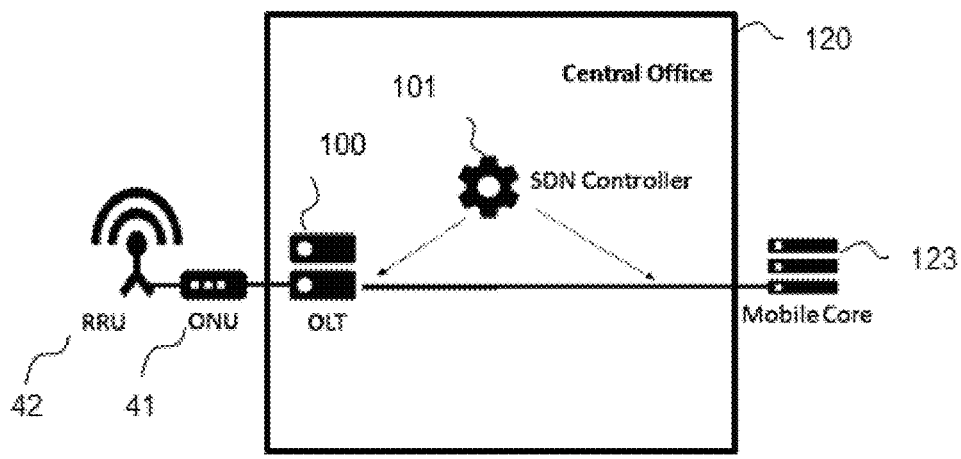
FIG. 8 schematically illustrates the base station connectivity once the base station has subscribed to the FTTH services, according to an embodiment (Direct connection to mobile core case).

In addition to the previous scenario, other alternatives are possible, as shown in FIGS. 7 and 8. In particular, FIG. 7 shows a scenario where the base station 40 is not directly connected to a single vBBU 116, but to a VLAN where different instances of vBBU 117 are connected. These vBBUs 117 are then connected to the required MEC components 118 (P-GW/S-GW), which provide direct connection to local services 119 and Internet 125. In this case, the virtualization capabilities available in the central office 120 will enable the option to deploy the required elements (e.g. vBBU, P-GW, S-GW and MEC elements) in real time if they are not already available in the central office 120.

FIG. 8 describes an additional scenario, where the base station 40 is connected directly to the mobile core 123, using the SDN capabilities, without requiring the deployment of any VNF.

The described method is based on the authentication of a technician in a captive portal 121, however it could be possible to authenticate the base station 40 by means of an AAA service (e.g. with RADIUS or DIAMETER servers) or other authentication methods, such as 802.1x or PPPoE.

Furthermore, this method could enable the deployment of vRAN in a central office 120 where no previous mobile access was available as the provision method does not only provide the connectivity to the base station 40, but can also deploy the required mobile network nodes, such as vBBU 116, 117, P-GW or S-GW 118.

By enabling a fast and automatized service provision and activation, the method can also be used to provide connectivity to Wi-Fi access points and connectivity services to small cells. Moreover, it could be used for fronthaul services in CRAN environments.

The method enables the activation of own base stations, but also from third parties.

Other methods for connecting mobile base stations use P2P active fiber connections which require configuration in both ends of the connection, i.e., at the base station 40 and concentration point/central office 120 could be also automatized by means of this method.

The proposed invention has a main advantage over state-of-the-art solutions as it provides the possibility of real time-provision of FTTH accesses for mobile base station backhaul, midhaul or fronthaul. This cannot be done with current solutions, as a manual activation of connection is required in order to enable the Service.

Furthermore, this provision method leverages on the method used for residential customers/users, making it very efficient, as the required investment decreases significantly. As in that scenario, by enabling a provision method based on the technician credentials instead of ONU 41 identification, a technician can replace the ONU 41 at any time without having to reconfigure the connection or requiring a pre-registration of the ONU 41.

The method increases flexibility as not only enables several methods for authentication, such as the preferred based on the technician credentials and a captive portal identification, but also other commonly available authentication methods, such as AAA, EAP or PPPoE. Moreover, it also enables different means to store the information regarding the services in use, that range from usual BSS to smart contracts that can be stored in a Blockchain.

Additionally, it reduces the time to activate the service from days to minutes, allowing a faster network roll-out or even a "on demand" deployment of mobile networks, where base stations or small cells can be activated and deactivated on real time. This way, a base station/small cell could be connected in any location with an optical termination provided by the service provider, as the fiber connection becomes a "FTTH-on-demand" service.

The method not only enables the automatization of the connectivity but also provides the means to deploy VNFs to customize the service.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

The invention claimed is:

1. An auto-provision method for Fiber-to-the Home (FTTH) backhaul, midhaul or fronthaul for mobile base stations based on software defined networking (SDN), wherein a base station is connected to an optical network unit, ONU, the method comprising:
   a) detecting, by an optical liner terminal, OLT, installed within an Internet service provider infrastructure when the ONU is connected to an optical termination point and responsive to said detection said OLT further notifying a software defined networking, SDN, controller installed at said Internet service provider infrastructure about the ONU-OLT connection;

b) providing, by the SDN controller, connectivity to said base station to a first restricted network providing access to a web site with limited connectivity, the web site with limited connectivity being part of the Internet service provider infrastructure;

c) receiving, by the web site with limited connectivity, credential information identifying a technician of the base station on the web site with limited connectivity, wherein the web site with limited connectivity, once the technician being connected therein, further receives configuration information specifying which Fiber-to-the Home, FTTH, backhaul, midhaul or fronthaul services the base station requires subscription; and d) disconnecting, by the SDN controller, the base station from the web site with limited connectivity and reconnecting the base station to a second network configured to provide access to a core network and to the subscribed FTTH backhaul, midhaul or fronthaul services to the base station.

2. The method of claim 1, wherein:

in step a) said notifying step further comprises sending, by the OLT, an event activating a temporary vCPE installed within the Internet service provider infrastructure;

in step b) said connectivity of the base station to the first restricted network being provided via said temporary vCPE, the base station being connected to the temporary vCPE via a first virtual local area network and the temporary vCPE being connected to the web site with limited connectivity via a second virtual local area network; and in step d) the disconnection of the base station from the web site with limited connectivity further comprises disconnecting the base station from the temporary vCPE.

3. The method of claim 1, wherein the FTTH backhaul, midhaul or fronthaul services include connectivity services and virtual network functions, VNFs, and multi-access Edge computing, MEC, services.

4. The method of claim 1, wherein the credential information being received via an online registration of the technician in the web site with limited connectivity or via an online or offline means provided by an operator of the first restricted network.

5. The method of claim 1, further comprising storing in a memory or database an identification number of the ONU upon the base station having accessed to the subscribed FTTH backhaul, midhaul or fronthaul services.

6. The method of claim 1, wherein the temporary vCPE being exclusive for the base station.

7. The method of claim 1, wherein the temporary vCPE being shared among other base stations.

8. The method of claim 1, further comprising storing in a smart contract of a Blockchain the subscribed FTTH backhaul, midhaul or fronthaul services.

9. A system for auto-provision Fiber-to-the Home (FTTH) backhaul, midhaul or fronthaul for mobile base stations based on software defined networking (SDN), comprising:

an Internet service provider infrastructure including an optical liner terminal, OLT, and a software defined networking, SDN, controller;

an optical termination point;

an optical network unit, ONU; and a base station, wherein the base station being adapted and configured to be connected to the ONU, wherein the OLT being adapted and configured to detect when the ONU is connected to the optical termination point and to notify the SDN controller upon said detection, the SDN controller being adapted and configured to provide connectivity to said base station to a first restricted network providing access to a web site with limited connectivity, the latter being part of the Access service provider infrastructure;

wherein the web site with limited connectivity being adapted and configured to receive credential information identifying a technician of the base station on the web site with limited connectivity and to, once the technician being connected therein, further receive configuration information specifying which Fiber-to-the Home, FTTH, backhaul, midhaul or fronthaul services the base station requires subscription; and wherein the SDN controller being adapted and configured to disconnect the base station from the web site with limited connectivity and to reconnect the base station to a second network configured to provide access to a core network and to the subscribed FTTH backhaul, midhaul or fronthaul services to the base station.

10. The system of claim 9, wherein the Internet service provider infrastructure further comprises a temporary vCPE adapted and configured to be connected to the OLT, the temporary vCPE being connected to the base station via a first virtual local area network and being connected to the web site with limited connectivity via a second virtual local area network to allow said connectivity between the base station and the first restricted network.

11. The system of claim 9, further comprising a smart contract in a Blockchain adapted and configured to store the subscribed TFFH backhaul, midhaul or fronthaul services.

12. The system of claim 9, wherein the ONU is integrated in the base station or is external to the base station.

13. The system of claim 9, wherein the base station comprises a macrocell or a microcell base station.

14. A computer program product tangibly embodied in a non-transitory machine-readable storage medium including code instructions that, when executed by at least one processor of a computer system implements the method of claim 1.

15. A computer program product tangibly embodied in a non-transitory machine-readable storage medium including code instructions that, when executed by at least one processor of a computer system implements the method of claim 2.

* * * * *